(12) United States Patent
Berechet et al.

(10) Patent No.: US 9,135,747 B2
(45) Date of Patent: Sep. 15, 2015

(54) METHOD FOR 3D RECONSTRUCTION OF AN OBJECT IN A SCENE

(75) Inventors: Ion Berechet, Vincennes (FR); Gérard Berginc, Thiais (FR); Stefan Berechet, Fontenay-Sous-Bois (FR)

(73) Assignees: THALES, Courbevoie (FR); SISPIA, Vincennes (FR)

( * ) Notice: Subject to any disclaimer, the term of this patent is extended or adjusted under 35 U.S.C. 154(b) by 329 days.

(21) Appl. No.: 13/604,237

(22) Filed: Sep. 5, 2012

(65) Prior Publication Data

US 2013/0100131 A1   Apr. 25, 2013

(30) Foreign Application Priority Data

Oct. 21, 2011   (FR) .................................... 11 03229

(51) Int. Cl.
*G06K 9/00*  (2006.01)
*G06T 17/05*  (2011.01)
*G06K 9/46*  (2006.01)

(52) U.S. Cl.
CPC ............ *G06T 17/05* (2013.01); *G06K 9/00201* (2013.01); *G06K 9/4671* (2013.01)

(58) Field of Classification Search
None
See application file for complete search history.

(56) References Cited

U.S. PATENT DOCUMENTS

| 6,278,798 | B1 * | 8/2001 | Rao ............................... 382/154 |
| 7,085,401 | B2 * | 8/2006 | Averbuch et al. ............. 382/103 |
| 7,961,934 | B2 * | 6/2011 | Thrun et al. .................. 382/154 |
| 8,611,674 | B1 * | 12/2013 | Beeler et al. .................. 382/218 |
| 2008/0181487 | A1 * | 7/2008 | Hsu et al. ...................... 382/154 |
| 2010/0231583 | A1 * | 9/2010 | Furukawa et al. ............ 345/419 |
| 2011/0019906 | A1 * | 1/2011 | Berginc et al. ................ 382/154 |
| 2011/0254924 | A1 * | 10/2011 | Berginc et al. ................ 348/46 |
| 2012/0207404 | A1 * | 8/2012 | Robles-Kelly et al. ....... 382/286 |

OTHER PUBLICATIONS

Franchini, Elena, Serena Morigi, and Fiorella Sgallari. "Implicit shape reconstruction of unorganized points using PDE-based deformable 3D manifolds." Numerical Mathematics: Theory, Methods and Applications (2010).*
Wyngaerd, Joris Vanden, et al. "Invariant-based registration of surface patches." Computer Vision, 1999. The Proceedings of the Seventh IEEE International Conference on. vol. 1. IEEE, 1999.*
Bouboulis, P., Leoni Dalla, and V. Drakopoulos. "Construction of recurrent bivariate fractal interpolation surfaces and computation of their box-counting dimension." Journal of Approximation Theory 141.2 (2006): 99-117.*

(Continued)

*Primary Examiner* — Stephen R Koziol
*Assistant Examiner* — Sean Conner
(74) *Attorney, Agent, or Firm* — Baker Hostetler LLP

(57) ABSTRACT

A method for 3D reconstruction of an object based on back-scattered and sensed signals, including: generating, from the sensed signals, 3D points to which their back-scattering intensity is respectively assigned, which form a set A of reconstructed data, starting from A, extracting a set B of data, whose points are located within a volume containing the object, as a function of volume characteristics F2, starting from B, extracting a set C of data characterizing the external surface of the object, the surface having regions with missing parts, depending on an extraction criterion, based on C, filling in the regions with missing parts by generation of a three-dimensional surface so as to obtain a set D of completed data of the object, without having to use an external database, and identifying the object based on D.

13 Claims, 4 Drawing Sheets

(56) References Cited

OTHER PUBLICATIONS

Toborg, Scott T. "Neural network vision integration with learning." Applications of Artificial Neural Networks II. International Society for Optics and Photonics, 1991.*

Ion Berechet et al.: "Advanced algorithms for identifying targets from a three-dimensional reconstruction of sparse 3D ladar data," Proceedings of SPIE, vol. 8172, Jan. 1, 2011, pp. 81720Z-81720Z-23.

J. C. Carr et al.: "Smooth surface reconstruction from noisy range data," Proceedings of the 1st International Conference on Computer Graphics and Interactive Techniques in Austalasia and South East Asia, Graphite '03, Jan. 1, 2003, p. 119.

Search report of corresponding French application No. 1103229, issued on Jul. 4, 2012.

* cited by examiner

METHOD FOR 3D RECONSTRUCTION OF AN OBJECT IN A SCENE

CROSS-REFERENCE TO RELATED APPLICATIONS

This application claims priority to foreign French patent application No. FR 11 03229, filed on Oct. 21, 2011, the disclosure of which is incorporated by reference in its entirety.

FIELD OF THE DISCLOSED SUBJECT MATTER

The field of the invention is that of active or passive three-dimensional electromagnetic or acoustic imaging in which three-dimensional images of an object are reconstructed containing all of the information in the three dimensions of the object whatever the plane of observation.

BACKGROUND

In the framework of laser imaging, a Ladar (Laser Radar) illuminates a scene 1 containing an object 10 which is partially camouflaged by any obstacle (trees in the figure) allowing part of the laser wave to pass as illustrated in FIG. 1. The wave is thus retro-reflected by the object 10 and the signal is analysed by the Ladar system. Various positions of the Ladar allow a 3D image to be reconstructed.

In the framework of passive imaging, a 3D image is reconstructed by using the reflections of external sources (sun, moon, background sky, etc.) on the object and/or the object's own thermal emission.

In this field of 3D imaging (passive or active), a set of measurements must be obtained relating to the object to be reconstructed depending on a variable angular observation parameter, this set of data allowing the volume to be reconstructed by applying techniques of inverse reconstruction. From a mathematical point of view, the technique makes use of a direct measurement. The inverse model is then used to restore the three-dimensional nature of the object, using the results of the direct measurement.

When the imaging system forms images of a scene containing an object partially camouflaged by trees, or by any other obstacle, the creation of a 3D image of an object present in a complex optronic scene is incomplete or missing parts.

There are two major types of 3D Ladar imaging, reflection tomography and profilometry.

Tomography uses two-dimensional laser images depending on a variable angle: the reconstruction of the totality of the scene common to all of the images of the sequence is carried out by a technique of the Radon transformation type.

Profilometry based on measurements of the time-of-flight of a laser wave uses the positions of various points of back-scattering from the objects of the scene classified in a three-dimensional space thanks to the determination of the time-of-flight of the laser wave and to the knowledge of the positioning of the laser beam. These profilometry systems use short pulses (of the order of a nanosecond) in order to discriminate the various echos over the same target line. This then generates a profile of the echos over the target line.

Wideband detectors can be used in order to reproduce the profile of the echo. Thus, for the 1.5 µm band, there are InGaAs detectors of the PIN type (P layer—Intrinsic layer—N layer) or of the APD (Avalanche PhotoDiode) type. A set of clusters of points corresponding to several positions of the system then just need to be concatenated. It is often necessary to process all of the data in order to compensate for the error in localization of the system. The method may be completed by a scan of the detection system and of the laser beam.

Another technique uses techniques for 'gating' the detector allowing sections of clusters of points to be reconstituted by means of a high-pulse-rate laser. The scene is then illuminated by a group of laser pulses whose back-scattering is collected according to the various depths of the objects in the scene, by a matrix of pixels having a precise time window or 'gate' of a few hundreds of picoseconds. The image is then obtained with a dimension linked to the depth. In order to obtain a 3D image, various viewing angles are needed.

In the various scenarios considered (sensors carried by a UAV, for Unmanned Aerial Vehicle, a helicopter or an aeroplane), the reconstruction is often incomplete when the object is camouflaged, the signals back-scattered by the object no longer allowing all of the information associated with the object to be obtained. This then results in incomplete and missing information leading to a process of partial inversion delivering an incomplete 3D image. The process of concatenation of clusters of points is considered as a process of inversion. One example of a process of partial inversion is shown in FIG. 2, for which the three-dimensional image is incomplete, and where the regions requiring a completion of data can be identified.

The techniques normally used to complete the three-dimensional image make use of a pre-existing database, a CAD database for example. The object reconstructed is then compared with elements of this database. If a correlation with the initial 3D object is obtained, the three-dimensional image is completed with the data, textured or otherwise, from the database. These completion algorithms depend on the richness of the CAD models in the database, which presents the huge drawback of not being usable if the object is unknown in this database.

SUMMARY

The aim of the invention is to overcome these drawbacks.

One subject of the invention is a method for 3D reconstruction of an object in a scene exposed to a wave, based on signals back-scattered by the scene and sensed, which comprises:

Step 1) generate, from the sensed signals, a set of 3D points to which their back-scattering intensity by the scene is respectively assigned, these 3D points associated with their intensity being denoted set A of reconstructed data, Step 2) starting from this set A of reconstructed data, extract a set B of data, whose points are located within a volume containing the object, as a function of volume characteristics F2.

It is mainly characterized in that it comprises the following steps:

Step 3) starting from the set B, extract a set C of data characterizing the external surface of the object, this surface having regions with missing parts, depending on an extraction criterion F1, Step 4) based on the data of C, fill in the regions with missing parts by generation of three-dimensional surface so as to obtain a set D of completed data of the object, without having to use an external database, Step 5) identify the object based on the set D.

This method is independent of an external database containing models of the CAD type and allows the three-dimensional image with missing parts to be completed thanks to techniques using the data made available by the reconstruction and to thus obtain a better identification thanks to a complete three-dimensional image.

Preferably, the step 1 furthermore comprises a step for noise reduction of the data of A.

The extraction criterion F1 is for example determined by a module for definition of the surface extraction criterion and/or the characteristics F2 are for example determined by a module for definition of the characteristics of the volume containing the object.

The step 4 for filling in regions with missing parts could comprise the following sub-steps:

Step 41), normalize the data of C characterizing the external surface, in order to obtain a set D12 of the normalized data of C, Step 42) based on the data of D12, extract relevant data denoted attractors and weight them, as a function of extraction and weighting criteria F75 (for example linked to the density of the spatial distribution of the data D12), in order to obtain a set D34 of weighted attractors, Step 43) from amongst the data of the set D34, select significant attractors as a function of a selection threshold F74, Step 44) reinforce the weight of the significant attractors as a function of spatially close data of C, in order to obtain a set D56 of reinforced significant attractors, Step 45) based on the data of D12 and of D56, generate a three-dimensional surface D.

The extraction and weighting criteria F75, and the selection threshold F74 can be determined by a module for control of these criteria F75 and of this selection threshold.

The step 45) for surface generation comprises for example the following sub-steps:

Send the data of D56 to several processes for surface generation, by means of a control module, Choose the best result or combine several results so as to obtain the set D.

When the identification of the step 5) is not successful, iterate the steps 3), 4) and 5) with a new criterion F1.

When the identification of the step 5) is not successful, iterate the steps 2), 3), 4) and 5) with new characteristics F2 of the volume containing the object.

When the identification of the step 5) is not successful, the method comprises steps for:

extracting invariants F3 in the data of D by means of a module for searching for invariants, completing, with these invariants F3, the set C of data characterizing the external surface of the object, injecting these invariants F3 into a database of invariants, iterating the steps 4) and 5) based on this new set C.

The step 4) for filling in regions with missing parts could comprise, prior to the step 42), a sub-step 41b) for normalizing the invariants, and for thus obtaining a set D23 of normalized invariants and in that the step 42) is carried out based on the data of D12 and of D23.

When the identification of the step 5) is not successful, iterate the steps 43), 44), 45) and 5) with a new selection threshold F74.

When the identification of the step 5) is not successful, iterate the steps 42), 43), 44), 45) and 5) with new extraction and weighting criteria F75.

When the identification of the step 5) is not successful, iterate the steps 42), 43), 44), 45) and 5) and if the step for extraction of invariants is carried out, this is based on the data of D and in the database of invariants.

The identification can be carried out by a user or by an automatic identification system.

The signals are sensed by an active or passive imaging system within the visible or IR domain.

BRIEF DESCRIPTION OF THE DRAWINGS

Other characteristics and advantages of the invention will become apparent upon reading the detailed description that follows, presented by way of non-limiting example and with reference to the appended drawings in which.

From one figure to another, the same elements are identified by the same references.

DETAILED DESCRIPTION

Figure 3:
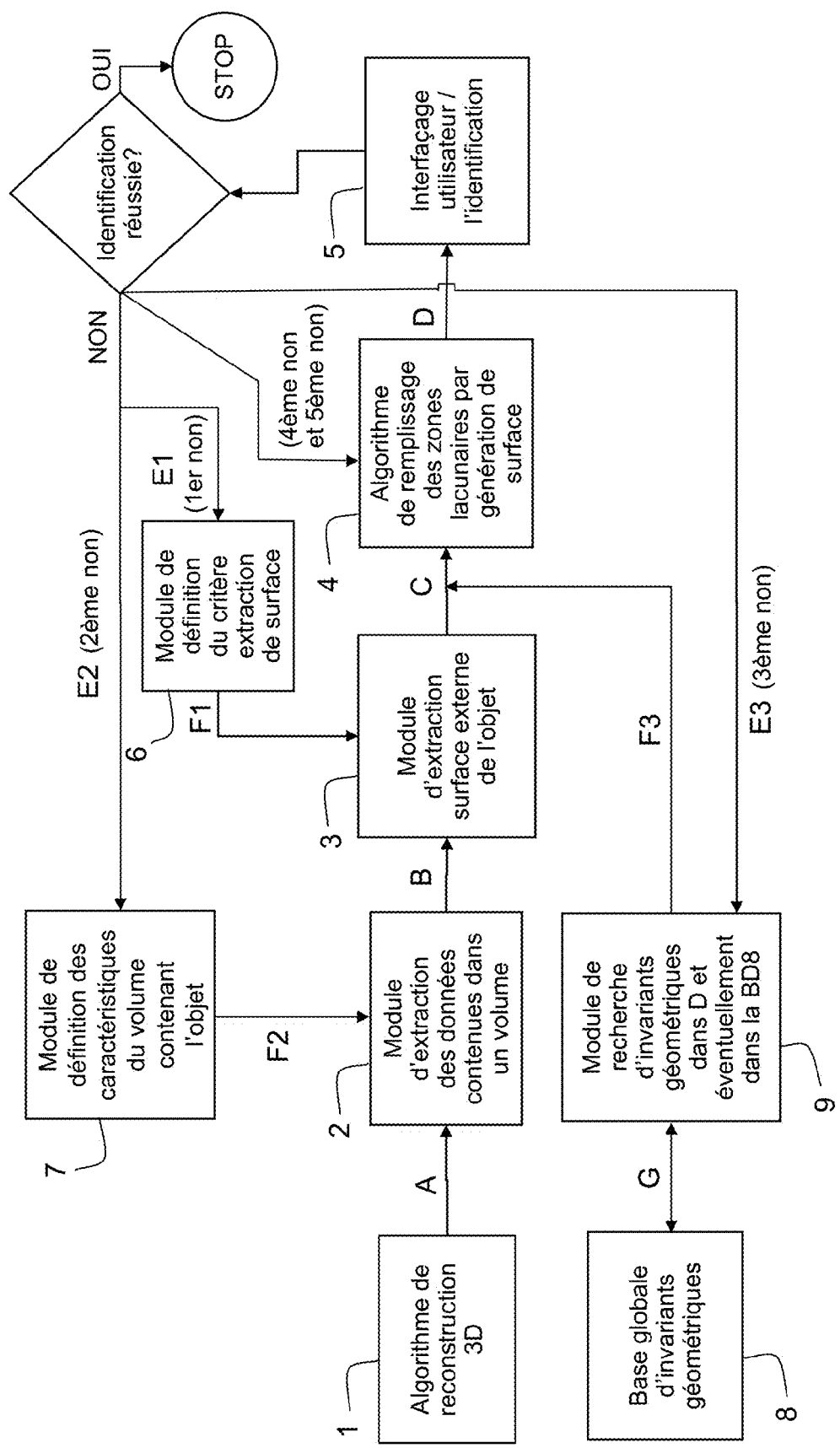
FIG. 3 is a diagram showing the sequence of the steps of the method according to the invention.

With reference to FIG. 3, one example is described of a method for completion of data for a three-dimensional reconstruction of objects according to the invention. It comprises, in this order, the following steps consisting in:

1) Based on the signals back-scattered by the scene 1, generate a set of points located in three-dimensional space to which intensities of back-scattering by the scene are assigned, denoted reconstructed data set. This reconstructed data set can be generated by using a method known by those skilled in the art such as described in the introduction such as a method of tomographic three-dimensional reconstruction, or of profilometric three-dimensional reconstruction, in other words taking into account the time-of-flight of the laser wave. Preferably, noise-reduce these reconstructed data so as to obtain a useful reconstructed data set. This reconstructed data set, useful or otherwise, is denoted A.

Figure 1:
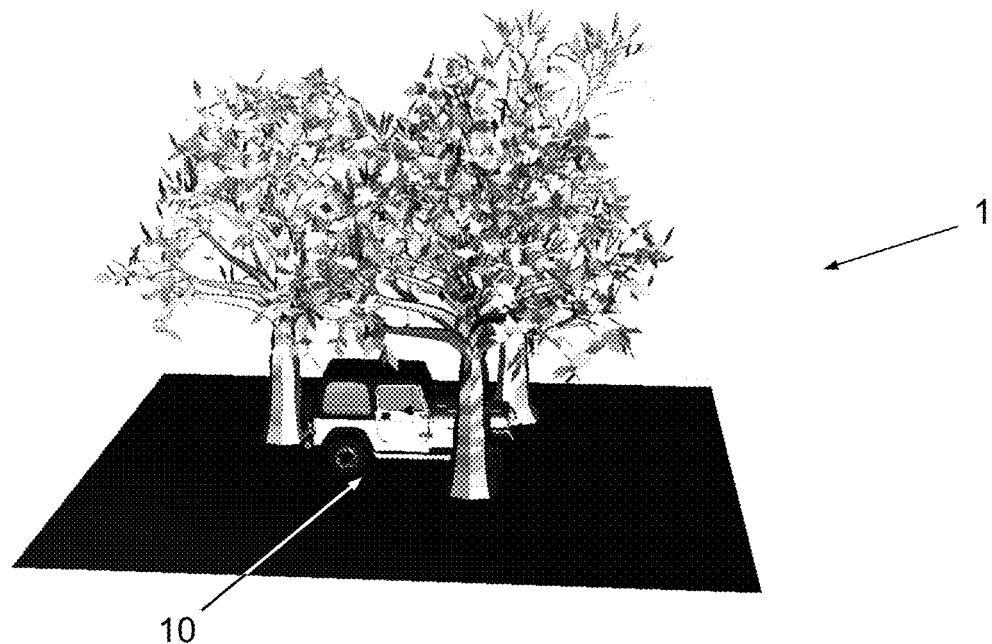
FIG. 1 shows an image of a scene with a partially camouflaged object such as acquired by an image sensor.
Figure 2:
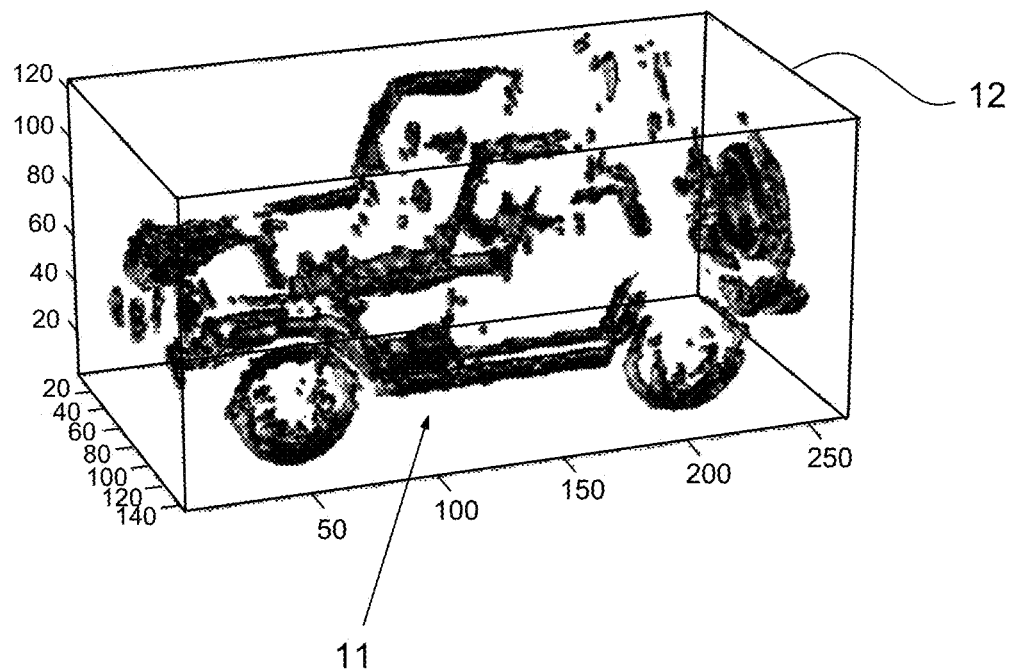
FIG. 2 shows one example of view of the data C, in other words a set of points identified in 3D space, with their intensity (the points have the same intensity in this figure) characterizing the various surfaces of the object in FIG. 1, obtained by the process of reconstruction, together with the volume containing the object, in this case a rectangular parallelepiped.

2) Starting from the reconstructed data of the set A, extract a set B from these data, this set B being included within a volume 12 containing the object (one example of which is shown in FIG. 2). This is for example a rectangular parallelepiped whose extraction is for example based on volume sub-divisions [(Xmin Xmax);(Ymin, Ymax);(Zmin;Zmax)] encompassing the data associated with the object. The characteristics F2 of this volume may be predefined or defined by the user or by a module 7 for control of these characteristics; they are for example defined by the user during a first iteration of the method, and by this control module during any potential subsequent iterations. This control module 7 is for example based on a search in correspondence tables, or on an associative grid of the Kohonen type, or on a knowledge base generated by adaptive learning, supervised or otherwise, or oriented by the user via zooms onto the data of A.

3) Starting from the set of the data B, extract a set C of points located in 3D space and associated with their intensities, characterizing the external surface of the object, this surface having regions with missing parts owing notably to camouflage. One example 11 of a set C is shown in FIG. 2. This extraction is for example based on intensity thresholding and/or on functions of the iso-surface type with:

a. intensity thresholding and/or
b. meshing of facets (triangular or rectangular or hexagonal) and/or
c. extraction of the apices of facets, together with the normals associated with each apex, with a criterion for selection of the points based on the normals (scalar product and barycentre, for example) and with the extraction of the points outside and/or inside the facets.

The values F1 of these extraction criteria can be predefined or defined by the user or by a module 6 for control of these extraction criteria which is for example based on a search in correspondence tables, or on an associative grid of the Kohonen type, or on a knowledge base generated by adaptive learning, supervised or otherwise.

4) Fill in the regions with missing parts of the set C by generation of a completed three-dimensional surface D of the object. Examples of surface generation are given hereinbelow. This step is carried out without having to use CAD models or others from an external database, such as for example geometrical attributes obtained outside of the method for reconstruction and identification.

5) Based on the completed data D of the object, identify the object. This identification can be made by a user by means of a dedicated user interface such as an interface using a touch screen and/or using a screen and keyboard and/or using voice recognition, optionally allowing the user to perform zooms on the three-dimensional data and to take the decision on the success of the identification of the object. This identification can also be made by a system of automatic identification for example a system based on shape recognition. When the identification is successful, the method is halted.

The step 4 for filling in the surfaces with missing parts will now be described in more detail. It comprises for example, in this order, the following sub-steps described with reference to FIG. 4:

41) Apply a process of normalization to the data of C characterizing the external surface of the target. This normalization process allows the set of the data of C to be rescaled and their analysis to be carried out using main components such as curves, surfaces, main volumes. The normalized data of C form a set D12.

42) Starting from the normalized data of C D12 and potentially also from normalized invariants D23, as will be seen hereinbelow, extract "attractors of three-dimensional information linked to the object" and weight them with respect to the number of points situated in a topological region associated with a predetermined threshold number of points, defined by means of a metric linked to the three-dimensional space (for example a Euclidean distance), these weighted attractors forming a set D34. They are extracted and weighted as a function of extraction and weighting criteria F75 which may be predetermined or determined by the user or by a module 46 for controlling these criteria F75. The attractors are relevant geometrical data coming from the set A, such as points, lines, curves, volumes, and are representative of the data of A. This extraction-weighting is of the deterministic type with, for example, an optimization with constraints which could use the internal point algorithm and/or a stochastic optimization based for example on Hopfield networks, or Boltzmann networks, or Simulated Annealing.

43) Select, from amongst the set D34, significant attractors with respect to a selection threshold F74, these significant attractors forming a set D45. The selection threshold F74 may be predetermined or determined by the user or by the module 46 also capable of controlling this weighting threshold; it is for example determined by the user during a first iteration of these steps, and by this control module 46 during any subsequent iterations. This control module 46 together with this selection 43 are for example based on an associative grid of the Kohonen type, or on a knowledge base generated by an adaptive learning, supervised or otherwise, and/or on associative memories and/or on classification trees.

44) Combine the significant attractors D45, in other words reinforce their weights with those of their nearby points extracted from the data D12, these reinforced attractors forming a set D56. This step is for example based on an associative grid of the Kohonen type, or on a knowledge base generated by an adaptive learning, supervised or otherwise, or on any other method for combining data.

45) Generate a three-dimensional surface based on the data D12 and on the reinforced attractors D56, the data of this surface forming the set D.

Figure 5:
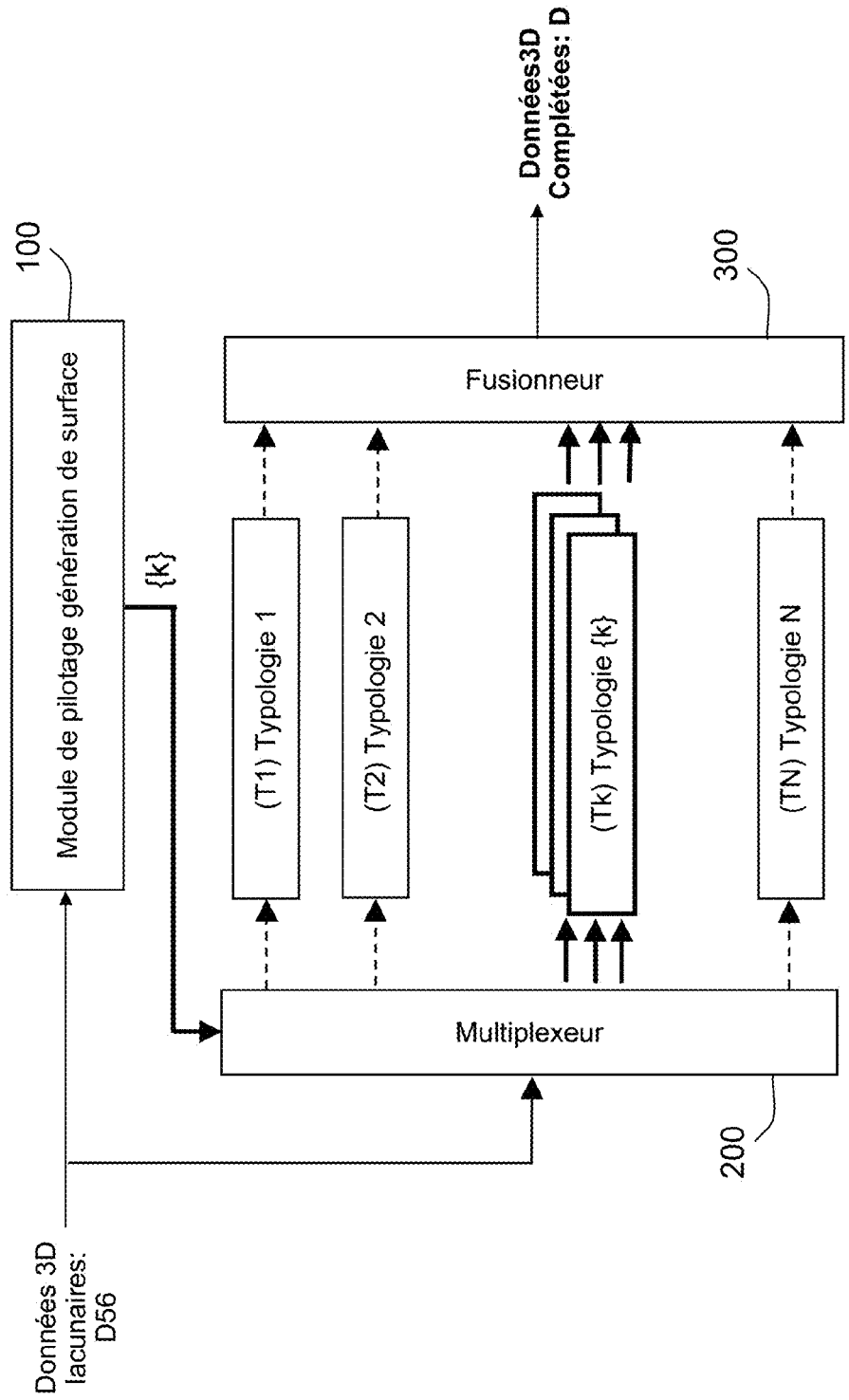
FIG. 5 is a diagram showing the sequence of the sub-steps of the step 45 for 3D surface generation.

The step 45 for generation of a three-dimensional surface D described with reference to FIG. 5, comprises for example, in this order, the following steps:

Send, by means of a module 100 for controlling the processes of surface generation, the data contained in the three-dimensional data with missing parts (=the set D56) to processes for 3D surface generation (denoted typology 1, . . . , typology k, . . . , typology N). Depending on the data D56, the control module 100 chooses one or more (or even all) processes of 3D surface generation; the data D56 are sent via a Multiplexer 200 to each chosen process. This control module is for example based on a search in correspondence tables, on an associative grid of the Kohonen type, on a knowledge base generated by adaptive learning (supervised or otherwise) and/or on associative memories and/or on classification trees.

Each method chosen supplies a set of completed data D1, D2, . . . , Dk, . . . DN. Amongst the processes of 3D surface generation used, mention may be made of algorithms of the minimum energy search type (for example potential energy of points) associated with the data D56, or of the stochastic relaxation type (Hopfield, Boltzmann, Simulated Annealing, for example), or of the Bayesian Regulation type (direct and/or retro-propagation), or of the wavelet analysis type (orthogonal wavelets, continuous wavelets, discrete wavelets, multi-resolution analysis), or of the Approximation by generalized regression type (linear and/or non-linear), or of the Optimization with constraints type (Newton optimization, Levenberg-Marquardt optimization, for example), or of the Basic radial functions type (Generalized Regression Networks, Probabilistic Neural Networks) or hybridizations of these algorithmic approaches.

Combine (with for example an additional filtering of aberrant points) the completed data D1, DN, by means of a combiner 300 in order to obtain D; the combination could consist in simply choosing the best result from amongst D1, . . . , DN. The combination is for example based on a correspondence table, or on a self-organizing Kohonen chart, or on a knowledge base generated by adaptive learning (supervised or otherwise) and/or on associative memories and/or on classification trees and/or any method for combining data.

Reference is now made to FIG. 3. If after the step 5, the identification of the object is not successful (→1st no), a new surface extraction criterion is defined and a new set C characterizing the external surface of the object is extracted (step 3). This new extraction criterion is for example defined via a request E1 sent to the module 6 for control of these extraction criteria, which establishes this new criterion F1 as previously indicated or for example by incrementation according to a pre-established law. According to one alternative, it can be defined by the user via his interface. This criterion F1 is then sent to the extraction module of the step 3 which delivers the new data of C.

Then, the step 4 is iterated using this new set C in order to generate a new set D of completed data of the object, followed by the identification step 5.

If the identification of the object is not successful (→2nd no), the characteristics F2 of a new volume containing the object are defined together with a new set B of points located in this new volume to which the intensities of back-scattering by the object are assigned. This new volume is for example defined via a request E2 for definition of the characteristics of this new volume, sent to the module 7 for controlling these characteristics, which determines F2, as previously indicated, or for example by incrementation according to a pre-established law. According to one alternative, they can be defined by the user via his interface. Then, the steps 2, 3, 4 and 5 are carried out using this new volume.

Figure 4:
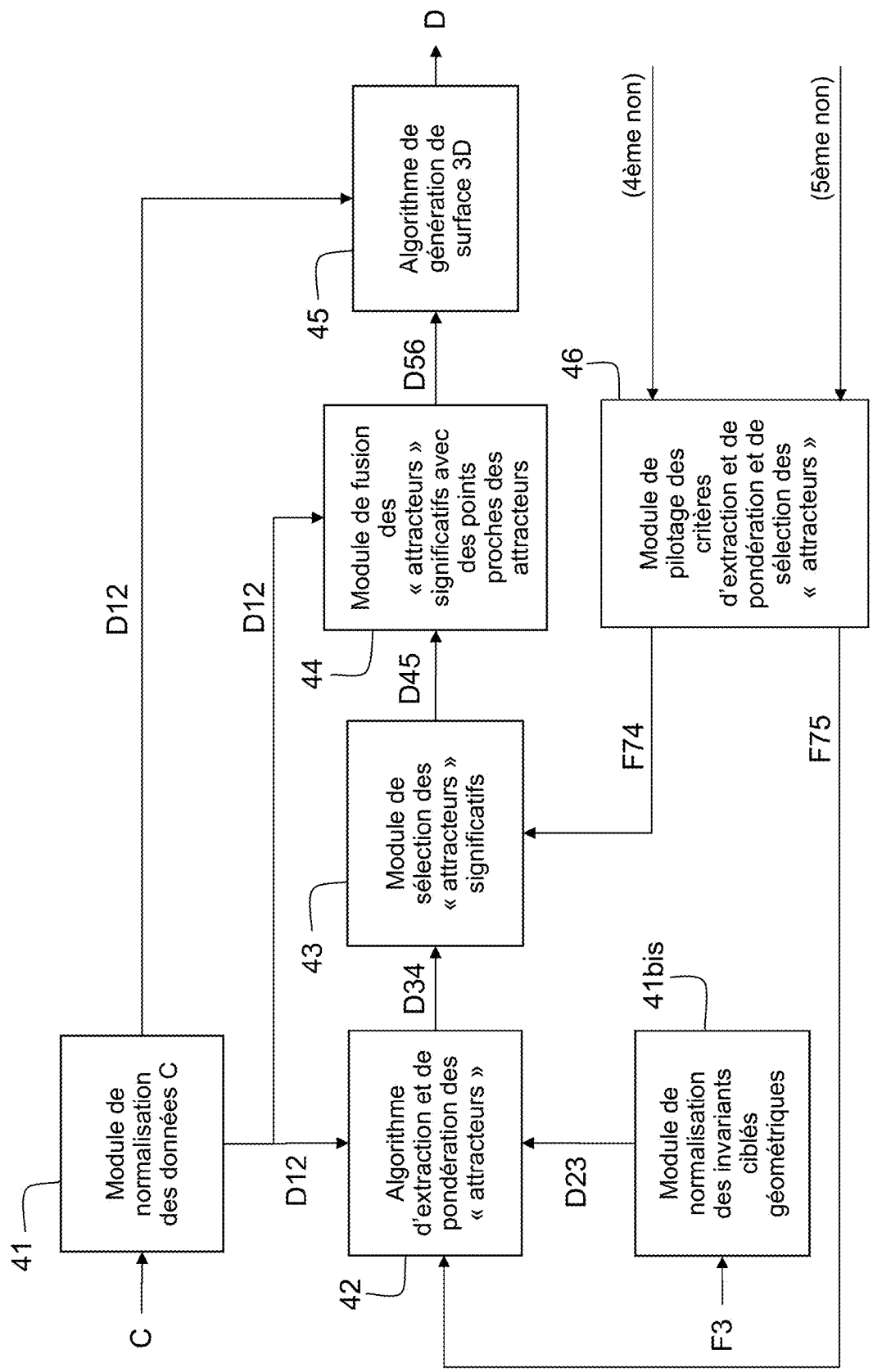
FIG. 4 is a diagram showing the sequence of the sub-steps of the step 4 for filling in the regions with missing parts.

Potentially, if the identification of the target is not successful (→3rd no):
Send a request for invariants E3 to a module 9 for searching for invariants.
Search for targeted geometric invariants F3 by means of the module 9 as a function of certain elements of D (for example, a part of a cylinder, a range of dimensions, etc.) based on correspondence tables and/or on a knowledge base generated by adaptive learning (supervised or otherwise) and/or on associative memories and/or on classification trees. These geometric invariants are created during the process of three-dimensional reconstruction without having to use data coming from databases external to the method. These targeted invariants are then introduced (G) into a database 8 of invariants, which comprises recognized elements (for example a wheel, a bonnet, a chassis, etc.), respectively associated with geometric invariants of the following type: reconstructed global object, dimensions of the object, dimensional ratios of the object, etc. These invariants are not necessarily only geometric; they may include information on colour, texture, or other attributes. This database 8 is only therefore supplied with information as the iterations of the method are run.
Based on these targeted geometric invariants F3 and on the set C characterizing the external surface of the target, carry out the step 4 for filling in the surfaces with missing parts, so as to generate a new set D of completed data. Reference is made to FIG. 4. The sub-steps of the step 4 then comprise, prior to the sub-step 42, an additional sub-step 41b:
Apply a process of normalization to the targeted invariants F3. This process of normalization allows these invariants F3 to be resealed and their analysis as main components to be carried out. The normalized data of F3 form a set D23.
The sub-step 42 is then carried out based on D12 and on D23.

Then, proceed with the steps 43, 44, 45 and 5.
If the identification of the target is not successful (→4th no):
a new selection threshold for the significant attractors F74 is determined by the module 46 for controlling the selection threshold, and the selection step 43 is iterated based on this new threshold and on the set D34, and delivers new significant attractors D45. The steps 44 and 45 are iterated and new completed data D are generated with a view to their identification during the step 5.

If the identification of the target is not successful (→5th no) at the end of the previous step, iterate the step 42 by modifying the extraction and weighting criteria F75 for the attractors by the module 46 for controlling these extraction and weighting criteria, so as to obtain a new set D34. Then, proceed with the steps 43, 44, 45 and 5 based on these new data D34.

If the identification of the target is not successful, iterate the procedure through steps 2, 3, 4 and 5, as previously indicated. If a search for geometric invariants is undertaken, this will be done based on the data of D and in the database of geometric invariants 8.

If the identification of the target is not successful, the method can continue by iterating the steps such as described, the user having the possibility of stopping the processing method at any time.

In the examples of iterations previously described in the case where the identification is not successful, the order of the steps may be changed. The steps following the 3rd no may be exchanged with those following the 1st no and vice versa. Similarly, those following the 2nd no may be exchanged with those following the 4th no, and vice versa.

These techniques can be integrated into optronic equipment for identification of targets referred to as "difficult to identify" at medium distance (from a few hundreds of meters to a few kilometers). This equipment may be integrated into a UAV system, helicopter or aeroplane for low-altitude reconnaissance.

These 3D laser imaging techniques are also applicable in the biomedical field notably for the identification of sub-cutaneous disorders.

The invention claimed is:

1. A method for three-dimensional (3D) reconstruction of an object in a scene exposed to a wave, based on signals back-scattered by the scene and sensed, the method comprises:
generating, from the sensed signals, a set of 3D points to which their back-scattering intensity by the scene is respectively assigned, the 3D points associated with their intensity being denoted set A of reconstructed data,
starting from the set A of reconstructed data, extracting a set B of data, whose points are located within a volume containing the object, as a function of volume characteristics F2, further comprises the following steps:
starting from the set B, extracting a set C of data characterizing an external surface of the object, the external surface having regions with missing parts, depending on an extraction criterion F1,
filling in the regions, based on the data of C, with missing parts by generating a three-dimensional surface so as to obtain a set D of completed data of the object, without having to use an external database, the filling step comprising the following sub-steps:
normalizing the data of C characterizing the external surface to obtain a set D12 of the normalized data of C,
extracting, based on the data of D12, relevant data denoted attractors and weight them, as a function of extraction and weighting criteria F75, to obtain a set D34 of weighted attractors, selecting significant attractors from amongst data of the set D34 as a function of a selection threshold F74, reinforcing weight of the significant attractors as a function of spatially close data of C to obtain a set D56 of reinforced significant attractors, generating a three-dimensional surface D based on the data of D12 and D56, comprising:

sending the data of D56 to several processes for 3D-surface generation, by means of a control module for choosing the 3D-surface generation processes among minimum energy search type, stochastic relaxation type, Bayesian regulation type, wavelet analysis type, approximation by generalized regression type, optimization with constraints type, or basic radial function type process, choosing a best result or combine several results supplied by the 3D-surface generation processes to obtain the three-dimensional surface D by means of a combiner, and identifying the object based on the three-dimensional surface D.

2. A method for 3D reconstruction of an object according to claim 1, wherein the generating step further comprises reducing noise of the data of A.

3. A method for 3D reconstruction of an object according to claim 1, wherein the extraction criterion F1 is determined by a module for definition of the surface extraction criterion or the volume characteristics F2 are determined by a module for definition of the characteristics of the volume containing the object.

4. A method for 3D reconstruction of an object according to claim 1, wherein the extraction and weighting criteria F75 and the selection threshold F74 are determined by a module for control of these extraction and weighting criteria and of this selection threshold.

5. A method for 3D reconstruction of an object according to claim 1, wherein when the identification of the identifying step is not successful, the method iterates the starting from set B, filling in the regions, and identifying steps with a new criterion F1.

6. A method for 3D reconstruction of an object according to claim 1, wherein when the identification of the identifying step is not successful, the method iterates the starting from the set A of reconstructed data, starting from the set B, filling in the regions, and identifying steps with new characteristics F2 of the volume containing the object.

7. A method for 3D reconstruction of an object according to claim 1, wherein when the identification of the identifying step is not successful, the method further comprises:

extracting invariants F3 in the data of D by means of a module for searching for invariants, completing, with the invariants F3, the set C of data characterizing the external surface of the object, injecting the invariants F3 into a database of invariants, iterating the filling in the regions and identifying steps based on the new set C.

8. A method for 3D reconstruction of an object according to claim 7, wherein the filling in the regions step comprises, prior to the extracting, based on the data of D12, relevant data step, a sub step for normalizing the invariants, and for thus obtaining a set D23 of normalized invariants and in that the extracting, based on the data of D12, relevant data step is carried out based on the data of D12 and of D23.

9. A method for 3D reconstruction of an object according to claim 1, wherein when the identification of the identifying step is not successful, iterate the selecting significant attractors, reinforcing the weight of the significant attractors, generating a three-dimensional surface D, and identifying steps with a new selection threshold F74.

10. A method for 3D reconstruction of an object according to claim 1, wherein when the identification of the identifying step is not successful, iterate the extracting, based on the data of D12, relevant data, selecting significant attractors, reinforcing the weight of the significant attractors, generating a three-dimensional surface D, and identifying steps with new extraction and weighting criteria F75.

11. A method for 3D reconstruction of an object according to claim 7, wherein when the identification of the identifying step is not successful, iterate the extracting, based on the data of D12, relevant data, selecting significant attractors, reinforcing the weight of the significant attractors, generating a three-dimensional surface D, and identifying steps and if the step for extraction of invariants is carried out, this is based on the data of D and in the database of invariants.

12. A method according to claim 1, wherein the identification is carried out by a user or by an automatic identification system.

13. A method according to claim 1, wherein the signals are sensed by an active or passive imaging system within the visible or IR domain.

* * * * *